(12) United States Patent
Seiter

(10) Patent No.: US 8,931,992 B2
(45) Date of Patent: Jan. 13, 2015

(54) CYLINDER RINGS

(75) Inventor: Kai Oliver Seiter, Butzbach (DE)

(73) Assignee: Leica Camera AG, Solms (DE)

( * ) Notice: Subject to any disclaimer, the term of this patent is extended or adjusted under 35 U.S.C. 154(b) by 1370 days.

(21) Appl. No.: 12/364,723

(22) Filed: Feb. 3, 2009

(65) Prior Publication Data

US 2009/0136316 A1 May 28, 2009

Related U.S. Application Data

(63) Continuation-in-part of application No. PCT/DE2007/001301, filed on Jul. 20, 2007.

(30) Foreign Application Priority Data

Aug. 4, 2006 (DE) .......................... 10 2006 036 890

(51) Int. Cl.
*F16B 33/00* (2006.01)

(52) U.S. Cl.
USPC .......................... 411/366.1; 396/533; 359/829

(58) Field of Classification Search
USPC ........ 411/204, 366.1, 87, 93, 178, 386, 3, 69, 411/89; 285/148.19, 32, 391, 390, 355, 89
See application file for complete search history.

(56) References Cited

U.S. PATENT DOCUMENTS

| 1,539,287 | A | * | 5/1925 | Wilson | 285/333 |
|---|---|---|---|---|---|
| 1,614,815 | A | * | 1/1927 | Wilson | 285/27 |
| 1,629,058 | A | * | 5/1927 | Wilson | 285/27 |
| 1,645,032 | A | * | 10/1927 | Wilson | 285/27 |
| 2,167,910 | A | * | 8/1939 | Rottenburg | 411/386 |
| 3,388,647 | A | | 6/1968 | Yajima | |
| 4,053,077 | A | * | 10/1977 | DeFelice | 215/217 |
| 4,271,974 | A | | 6/1981 | Quinard | |
| 4,362,419 | A | | 12/1982 | Duncan | |
| 4,669,624 | A | * | 6/1987 | Wiles et al. | 215/330 |
| 4,701,088 | A | * | 10/1987 | Crull | 411/369 |
| 5,006,026 | A | * | 4/1991 | Estrada | 411/369 |
| 5,248,232 | A | * | 9/1993 | Chiang | 411/237 |
| 5,320,467 | A | * | 6/1994 | Erbes | 411/386 |
| 5,447,398 | A | * | 9/1995 | Chiang | 411/237 |
| 5,835,289 | A | | 11/1998 | Berry | |
| 7,025,552 | B2 | * | 4/2006 | Grubert et al. | 411/546 |
| 7,237,810 | B2 | * | 7/2007 | Hollingsworth et al. | 285/390 |
| 2003/0155768 | A1 | * | 8/2003 | Hollingsworth et al. | 285/333 |
| 2005/0053445 | A1 | * | 3/2005 | Miller | 411/344 |

FOREIGN PATENT DOCUMENTS

| DE | 79 16 575 U1 | 10/1979 |
|---|---|---|
| DE | 42 16 151 A1 | 11/1993 |
| DE | 296 17 039 U1 | 2/1997 |
| JP | 8-43705 A | 2/1996 |

* cited by examiner

*Primary Examiner* — Gary Estremsky
(74) *Attorney, Agent, or Firm* — Foley & Lardner LLP

(57) ABSTRACT

Cylinder rings having single-start nut and bolt threads matched to one another and axial stop surfaces, running perpendicularly to the cylinder axis, between the cylinder rings are distinguished by the fact that the stop surfaces (11, 12) assigned to the nut thread (3) and the bolt thread (4) extend in an axially rising manner over at most one thread turn and each have at the end a step surface (13, 14) between the axially offset stop planes of the stop surfaces (13, 14).

13 Claims, 5 Drawing Sheets

CYLINDER RINGS

CROSS-REFERENCE TO RELATED PATENT APPLICATIONS

This application is a Continuation-In-Part of U.S. Application PCT/DE2007/001301, filed Jul. 20, 2007, which is incorporated herein by reference in its entirety. The right of foreign priority is also claimed under 35 U.S.C. §119(a) based on Federal Republic of Germany Application No. 10 2006 036 890.8, filed Aug. 4, 2006, the entire contents of which, including the specification, drawings, claims and abstract, are incorporated herein by reference.

BACKGROUND OF THE INVENTION

The invention relates to cylinder rings with mutually coordinated single-flight nut threads and bolt threads and with axial stop faces, running perpendicularly with respect to the cylinder axis, between the cylinder rings.

Cylinder rings of this type are used in precision mechanical and optical apparatus construction for the screw connection of components or accessories. A nut thread on the front side of photographic objectives serves, for example, for the reception of filters or shutters provided with a bolt thread. An objective may likewise be equipped with a bolt thread for insertion into a nut thread in the housing of a camera (JP 08043705 A Patent Abstracts of Japan).

The cylinder rings have axial stop faces which run perpendicularly with respect to the cylinder axis and which define how far said cylinder rings can be screwed one into the other. The stop faces may be provided on the end face of the nut thread or on the foot side of the bolt thread, or vice versa. By an appropriate dimensioning of the thread diameters, the stop faces can in each case be generated on the end face or on the foot side with respect to the thread flights on the cylinder rings. The stop faces are annular faces.

Screw fastenings for containers are known from DE 42 16 151 A1, DE 296 17 039 U1 and DE 79 16 575 U1. A closing cap with an internal thread and a corresponding external thread on the container are provided with radial stop faces which limit the rotational movement when the closing cap is screwed on in an end position.

Usually, the nut thread is the stationary part and the accessory is screwed with the bolt thread into the nut thread. In this case, there is often the requirement that the accessory should have a specific orientation with respect to its rotary position when the stop faces butt one against the other. In the case of an objective screwed into the camera housing, the lettering on adjusting rings should be legible from above in a normal posture. A pole filter screwed into an objective and an angular lens hood should be oriented automatically with respect to the image format.

The desired orientation of the rotary position cannot be achieved by means of simple threads on account of the relatively high tolerances in the engagement of the threads one into the other. The play in the thread flights which is necessary for an easy motion of the threads gives rise, when the stop faces are rotated firmly one against the other, to additional angular twists. Threads cut to the measurement point, as they are known, which allow an engagement of the threads which is fixed exactly radially, also possess tolerances of up to 5° in the rotary position until the stop faces are seated firmly.

For the fastening of accessories with an automatically exact rotary angle orientation, bayonet connections are therefore selected. These possess claws which hook on the counterpiece as a result of a rotational movement. Such bayonets consist of highly complicated milled parts and additionally require a spring ring for securing against unintentional loosening. An additional rotary stop ensures the desired rotary orientation. The components mentioned are complicated to produce and take up a relatively large construction space.

SUMMARY OF THE INVENTION

An object on which the invention is based was, therefore, to provide a connection for the reception of accessories, which is simple to produce, requires a small construction space and ensures an exact angular orientation.

This object is achieved, according to the invention, by means of cylinder rings of the type initially mentioned, in that the stop faces assigned to the nut thread and to the bolt thread extend, axially upward, over a maximum of one thread flight and have at the end in each case a jump face between the axially offset stop planes of the stop faces. The jump face in this case forms a defined rotary stop. In a developed view, the upward-rising stop faces on the nut thread and on the bolt thread have preferably the same profile. What can be achieved with a suitable choice of the pitch of the stop faces is that the axial stop faces are pressed firmly one against the other into abutment against the rotary stop.

In a preferred embodiment, the stop faces rise upward parallel to the thread pitch. For a visually advantageous external appearance, it is expedient if the stop faces assigned to the nut threads are formed inside the cylinder ring and the stop faces assigned to the bolt threads are formed on the end face of the threaded bolt. If the jump faces are oriented parallel to the cylinder axis, a particularly stable rotary stop is obtained. It may be necessary, for manufacturing reasons, not to cause the stop faces to rise upward over the entire length of a thread flight, so that an inclined jump face is obtained. An inclined jump face has also proved to be a reliable rotary stop.

In an advantageous production of the stop face according to the invention inside the nut thread, the end of the nut thread lying in the cylinder ring is followed by a milled clearance of rectangular cross section which is formed in the radial direction and which runs approximately parallel to the thread pitch and has a length of a maximum of one thread flight, the width of the milled clearance corresponding at least to the height of a thread flight, and the depth extending at least as far as the core of the thread. The foot region of the bolt thread is expediently provided with a peripheral relief groove into which, for example, an O ring can be inserted as an anti-twist device. The height of the bolt thread and the depth of the nut thread must for this purpose be coordinated with one another such that a slight upsetting of the O-ring is obtained upon abutment against the rotary stop.

Advantageously, two cylinder rings may also be formed in one piece as an adapter ring with a nut thread and a bolt thread, the jump faces being in alignment with one another in the axial direction.

Further objects, features and advantages of the present invention will become apparent from the detailed description of preferred embodiments that follows, when considered together with the accompanying figures of drawing.

BRIEF DESCRIPTION OF THE DRAWINGS

Exemplary embodiments of the cylinder rings are illustrated diagrammatically in the drawing and are described below with reference to the figures in which.

DETAILED DESCRIPTION OF THE PREFERRED EMBODIMENTS

Figure 1:
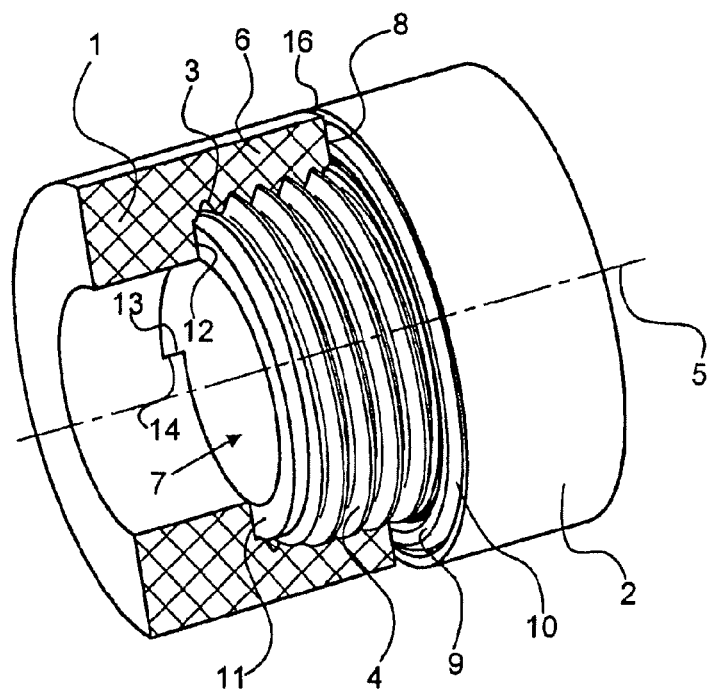
FIG. 1 shows cylinder rings with internal stop faces and a jump face oriented parallel to the cylinder axis, in a partially sectional perspective view.

The system illustrated in FIG. 1 consists of two cylinder rings 1, 2 of identical wall thickness. A nut thread 3 is cut into the cylinder ring 1. The cylinder ring 2 is provided with a bolt thread 4. The threads running symmetrically with respect to the cylinder axis 5 are selected in their diameter such that sufficiently large wall thicknesses are obtained for the thread casing 6 of the nut thread 3 and for the thread core 7 of the bolt thread 4. The end face 8 of the thread casing 6 matches with a foot face 9 of the bolt thread 4. A slot 10 is introduced into the foot face 9 of the bolt thread 4.

The thread core 7 is designed on the end face as a first stop face 11. Correspondingly to this, a second stop face 12 is formed on the foot side of the nut thread 3. The stop faces 11, 12 axially limit the screwing movement in the axial direction and rise upward over a thread flight. The thread core 7 has no thread burr in this region, and therefore it constitutes an axially rising cylinder which does not collide with the nut thread 3. The pitch height of the helical stop faces 11, 12 preferably corresponds to the flight height of a thread flight. Between the start and the end of the respective helix, a jump face 13, 14 with at most the height of a thread flight is thus obtained. In this exemplary embodiment, the jump faces 13, 14 are oriented parallel to the cylinder axis 5.

When the threads are screwed one into the other, during the last thread turn the stop faces 11, 12 run one onto the other in a wedge-shaped manner until they butt against the jump faces 13, 14. The jump faces 13, 14 therefore form the desired defined rotary stop. What can be achieved by a suitable matching of the thread lengths and pitches of the stop faces 11, 12 is that the stop faces 11, 12 rub one on the other even before the rotary stop is reached, so that, when the rotary stop is reached, an anti-loosening effect is obtained. This is advantageous particularly when the cylinder rings 1, 2 are produced from plastic as injection moldings.

Figure 2:
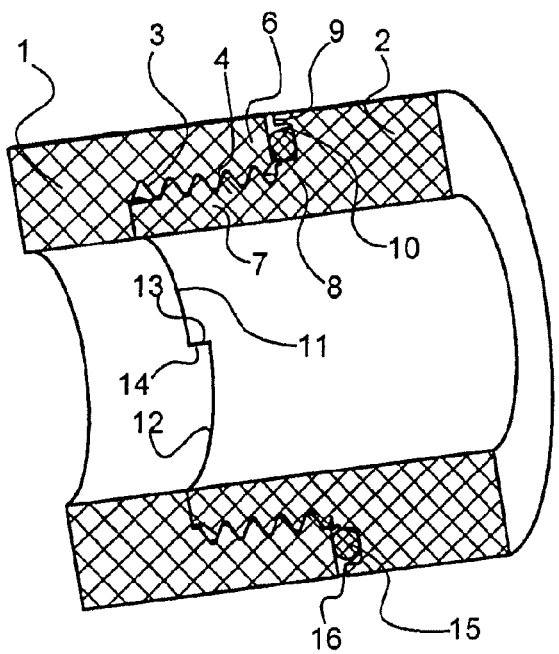
FIG. 2 shows a sectional illustration of the arrangement according to FIG. 1.

It is clear from FIG. 2 that an O-ring 15 is introduced into the slot 10 on the foot face 9 of the bolt thread 4. The height of the threaded bolt or the depth of the nut thread 3 are selected such that, when the rotary stop is reached, a slight upsetting of the O ring 15 with respect to the end face 8 of the thread casing 6 occurs as an anti-loosening device. A minimum air gap may in this case remain between the stop faces 11, 12. The thread flanks of the nut thread and bolt thread are thus protected against damage caused by mutual bracing to provide an anti-loosening effect. A small gap 16 remains in the end position between the two cylinder rings 1, 2.

Figure 3:
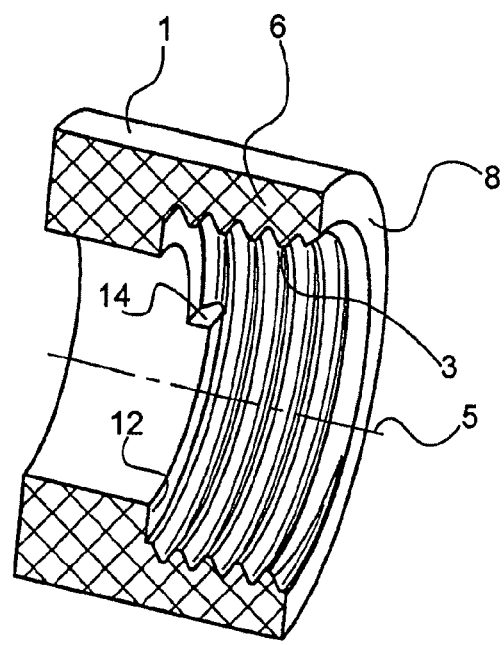
FIG. 3 shows the cylinder ring with a nut thread from FIG. 1.
Figure 4:
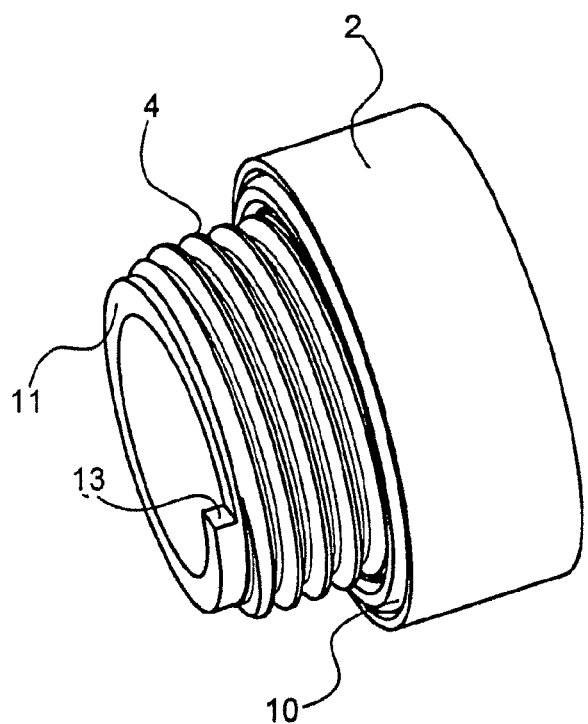
FIG. 4 shows the cylinder ring with a bolt thread from FIG. 1.

The form of the stop faces 11, 12 and of the jump faces 13, 14 may be gathered once again, in an individual illustration, from FIG. 3 and FIG. 4.

Figure 5:
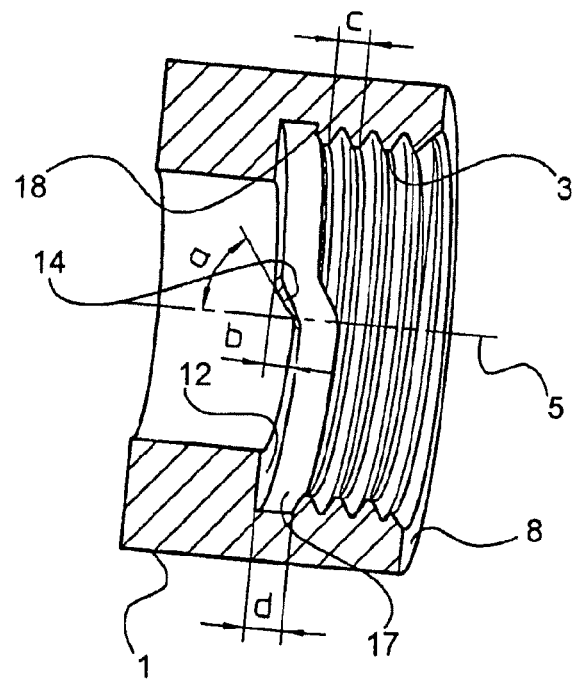
FIG. 5 shows a cylinder ring with an inclined jump face in the nut thread.
Figure 6:
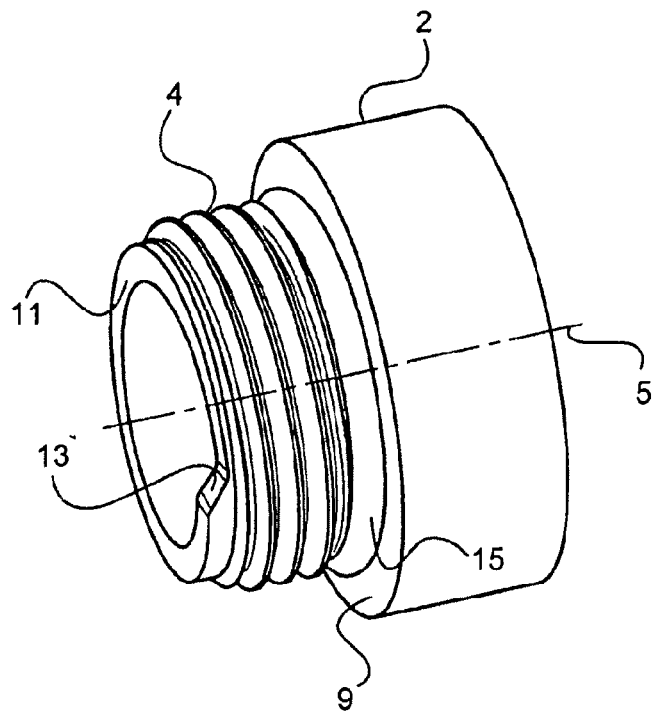
FIG. 6 shows a cylinder ring with a bolt thread fitting with FIG. 5.

FIG. 5 and FIG. 6 show, in individual illustrations, cylinder rings 1, 2 with a nut thread 3 and with a bolt thread 4 which are preferably manufactured from metal, because they have undercuts which are not suitable for manufacture by injection molding.

In the nut thread 3 illustrated in FIG. 5, a milled clearance 17 having a rectangular profile is provided at the internal thread end. The milled clearance is milled from inside, rising upward in the axial direction, into the nut by means of a milling cutter of diameter (d). The stop face 12 in this case contains a jump face 14 inclined at the angle (a). The inclination is obtained as a result of the insertion and run-out of the milling cutter from the milled clearance in the region of the jump face 14. The pitch (b) of the axially upward-rising helix of the stop face 12 from the top edge to the bottom edge of the jump face 14 should be selected so as to be somewhat smaller than the thread pitch (c). The axial position of the milled clearance 17 is preferably to be selected such that no acute-angled edge 18 on the adjacent thread flank is obtained. The depth of the milled clearance is designed to extend to the core of the nut thread 3.

In the bolt thread 4 illustrated in FIG. 6, first, a cylindrical end is produced on the end face, from the thread core, in a height amounting at most to a thread flight. The jump face 13 is milled into this thread core, and then the material is removed helically in an amount corresponding at most to the thread pitch, until the top edge of the jump face 13 is reached. The stop face 11 thus obtained forms the axial stop of the bolt thread 4. The contour of the stop face 11 on the bolt thread 4 will preferably be identical, in a developed view, to the contour of the stop face 12 in the milled clearance 17 on the nut thread 3.

A peripheral relief groove, into which an O ring 15 is introduced, is milled into the thread in the foot region of the bolt thread 4. The length of the nut thread 3 is selected such that, when the cylinder rings 1, 2 are screwed together up to the jump faces 13, 14, the O-ring 15 experiences a slight upsetting as an anti-loosening device.

To produce an adapter ring, a nut thread may also additionally be cut into the cylindrical ring part of the bolt thread 4, as illustrated in FIG. 5. In this case, care must be taken to ensure that the jump faces 13, 14 are in alignment with one another in the axial direction. The radial position of the jump faces 13, 14 may in each case be marked on the outside of the cylinder rings 1, 2. The accessories to be connected can then be inserted with regard to the desired rotary orientation in relation to these markings.

Figure 7:
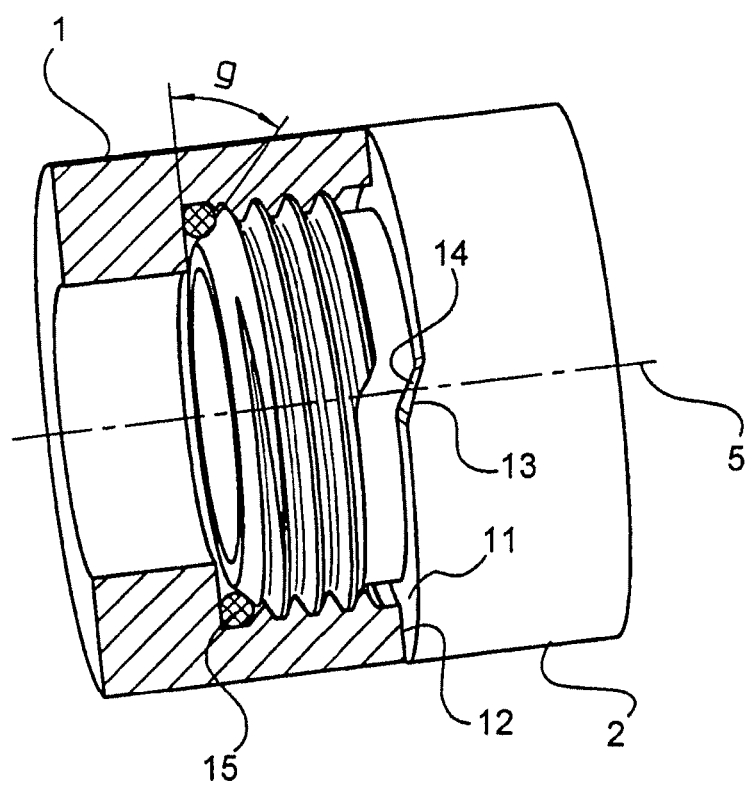
FIG. 7 shows cylinder rings with a contour of the stop faces which can be seen from outside.
Figure 8:
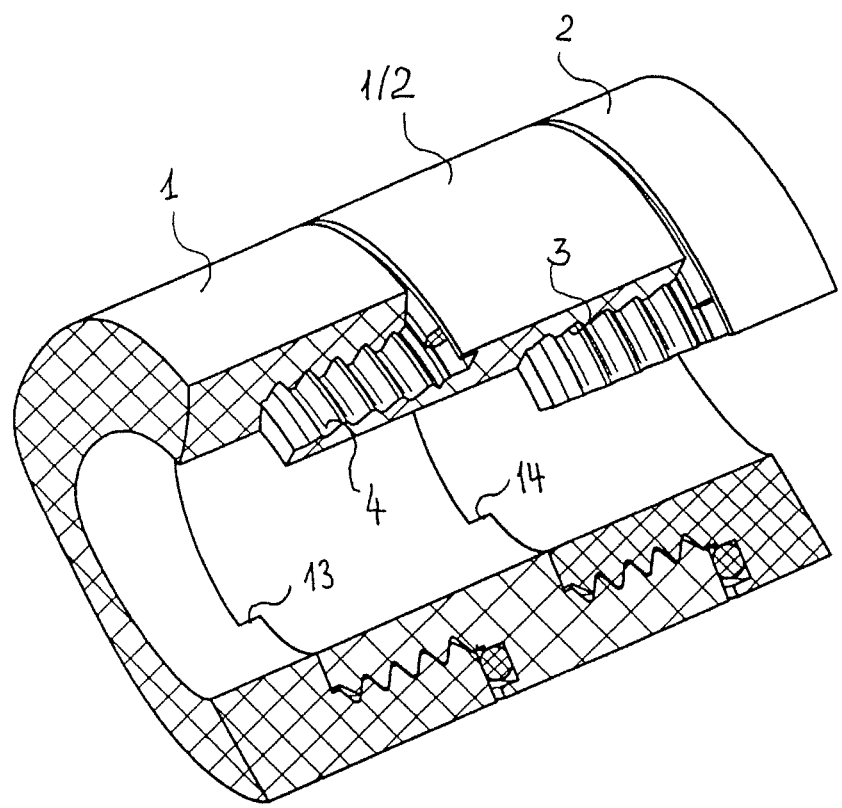
FIG. 8 is an adapter ring combining a mother part and a pin part thread.

FIG. 7 shows an alternative arrangement of the stop faces 11, 12 in the foot region of the bolt thread 4 and on the end face of the nut thread 3. In this arrangement, the helical run of the stop faces 11, 12 and the inclined jump faces 13, 14 can be seen on the cylinder rings 1, 2 from outside. In this arrangement, an O-ring 15, as an anti-loosening device, may be introduced into the nut thread 3 on the inside. For this purpose, the bolt thread 4 running out on the end face is expediently beveled at an angle (g) with respect to the foot face of the nut thread 3.

This arrangement may, of course, also be adopted in a similar way in the embodiment according to FIG. 1.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto and that the claims encompass all embodiments of the invention, including the disclosed embodiments and their equivalents.

LIST OF REFERENCE SYMBOLS 1, 2 Cylinder rings
3 Nut thread
4 Bolt thread
5 Cylinder axis
6 Thread casing nut thread
7 Thread core bolt thread
8 End face thread casing
9 Foot face bolt thread
10 Slot
11 Stop face on the bolt thread
12 Stop face on the nut thread
13 Jump face on the bolt thread
14 Jump face on the nut thread
15 O-ring
16 Gap
17 Milled clearance
18 Edge on thread flank
a Angle of inclination on jump face
b Pitch of helix of stop faces
c Thread pitch
d Height of the milled clearance
g Angle of inclination of the end face of bolt thread

What is claimed is:

1. Cylinder rings comprising a first cylinder ring including nut threads and a stop face, and a second cylinder ring including bolt threads and a stop face located on the root cylinder of the bolt threads: wherein the nut threads and the bolt threads are mutually coordinated single-flight threads, the stop faces are arranged to limit the screwing movement in the axial direction between the cylinder rings, the stop faces extend axially over a maximum distance equivalent to one thread flight such that a first end and a second end of each stop face are axially offset, a jump face extends between the first and second ends of the stop faces, and wherein the nut threads and the bolt threads extend axially at least one complete turn.

2. The cylinder rings as claimed in claim 1, wherein the stop faces extend approximately parallel to the thread pitch.

3. The cylinder rings as claimed in claim 2, wherein the end of the nut thread of the first cylinder ring is followed by a milled clearance of rectangular cross section which is formed in the radial direction and which runs approximately parallel to the thread pitch and has a length of a maximum of one thread flight, the width of the milled clearance corresponding at least to the height of a thread flight, and the depth extending at least as far as the core of the thread.

4. The cylinder rings as claimed in claim 1, wherein the stop face of the first cylinder ring is formed inside the first cylinder ring and the stop face of the second cylinder ring is formed on an end face of the second cylinder ring.

5. The cylinder rings as claimed in claim 4, wherein a foot region of the bolt threads has at peripheral relief groove for receiving an O-ring.

6. The cylinder rings as claimed in claim 1, wherein the jump faces are oriented parallel to the cylinder axis.

7. The cylinder rings as claimed in claim 1, wherein the length of the stop faces is smaller than the length of a thread flight, and the jump faces are inclined relative to the axial direction.

8. The cylinder rings as claimed in claim 1, wherein the cylinder rings are formed in one piece with a nut thread and with a bolt thread, the jump faces being in alignment with one another in the axial direction.

9. The cylinder rings as claimed in claim 1, wherein the cylinder rings are part of an optical device.

10. The cylinder rings as claimed in claim 1, wherein the nut threads and the bolt threads are helical threads arranged in a cylindrical configuration.

11. The cylinder rings as claimed in claim 1, wherein the stop faces are annular faces of the cylinder rings.

12. Optical components comprising cylindrical threads having mutually coordinated single-flight nut threads and bolt threads with stop faces, limiting screwing movement in the axial direction, between the cylindrical threads, wherein the stop faces assigned to the nut thread and to the bolt thread extend, axially upward, over a maximum of one thread flight and have at the end in each case a jump face between axially offset stop planes of the stop faces, and wherein the nut threads and the bolt threads extend axially at least one complete turn to connect the optical components.

13. The optical components as claimed in claim 12, wherein the cylindrical threads are helical threads.

* * * * *